(12) United States Patent
Watanabe et al.

(10) Patent No.: US 7,741,852 B2
(45) Date of Patent: Jun. 22, 2010

(54) IONIZATION VACUUM GAUGE

(75) Inventors: Fumio Watanabe, Ibaraki (JP); Reiki Watanabe, Ibaraki (JP)

(73) Assignee: Mori Patent Office, Tokyo (JP)

( * ) Notice: Subject to any disclaimer, the term of this patent is extended or adjusted under 35 U.S.C. 154(b) by 314 days.

(21) Appl. No.: 11/920,085

(22) PCT Filed: May 8, 2006

(86) PCT No.: PCT/JP2006/309612

§ 371 (c)(1),
(2), (4) Date: Nov. 8, 2007

(87) PCT Pub. No.: WO2006/121173

PCT Pub. Date: Nov. 16, 2006

(65) Prior Publication Data

US 2009/0096460 A1    Apr. 16, 2009

(30) Foreign Application Priority Data

May 9, 2005    (JP) .............................. 2005-136760

(51) Int. Cl.
*G01L 21/32* (2006.01)
(52) U.S. Cl. ...................................... 324/462; 324/464
(58) Field of Classification Search ......... 324/460–464; 315/111.91; 313/7
See application file for complete search history.

(56) References Cited

U.S. PATENT DOCUMENTS 2,454,564 A * 11/1948 Nelson .................. 315/111.91
2,963,601 A * 12/1960 Vanerin, Jr. et al. ............ 313/7
6,566,884 B2 * 5/2003 Rutherford et al. .......... 324/460

FOREIGN PATENT DOCUMENTS

| JP | 62-49232 | 3/1987 |
| JP | 01-143928 | 6/1989 |
| JP | 10-213509 | 8/1998 |
| JP | 2000-039375 | 2/2000 |
| JP | 2000-329634 | 11/2000 |

* cited by examiner

*Primary Examiner*—Vincent Q Nguyen
(74) *Attorney, Agent, or Firm*—Kubotera & Associates LLC

(57) ABSTRACT

An ionization vacuum gauge which has at least three electrodes of a grid (2), an electron source (3) and an ion collector (1) in a vacuum vessel (4) connected in communication with a vacuum apparatus, oscillates electrons emitted front the electron source (3) within and outside of the grid (2), ionizes gas molecules flying into the grid (2) by the oscillated electrons, supplements the ionized ions by the ion collector (1) to convert into a current signal, and measures a gas molecular density (pressure) in the vacuum apparatus according to the obtained current intensity, wherein the ion collector (1) is provided with a heating device for heating the ion collector.

11 Claims, 10 Drawing Sheets

IONIZATION VACUUM GAUGE

TECHNICAL FIELD

The present invention relates to an ionization vacuum gauge for measuring a gas molecular density, namely a pressure, of gas molecules within a vacuum apparatus.

PRIOR ART

As a typical example of measuring a gas density (pressure) remaining in the vacuum apparatus, a related art will be described with reference to an ionization vacuum gauge shown in FIG. 10.

This ionization vacuum gauge is called a Bayard-Alpert type ionization vacuum gauge (hereinafter referred to as the BA type), which is generally capable of measuring a very wide pressure range of 0.1 Pa to $10^{-9}$ Pa and now most popular.

This ionization vacuum gauge has three electrodes of a grid 2, an electron source 3 and an ion collector 1' within a vacuum vessel 4 connected in communication with a vacuum apparatus, oscillates the electrons emitted from the electron source 3 within and outside of the grid 2, ionizes the gas molecules which fly into the grid 2 by the oscillated electrons, supplements the ionized ions by an ion collector 1 to convert into a current signal, and measures the gas molecular density (pressure) in the vacuum apparatus from the obtained current intensity. In FIG. 10, reference numeral 4' denotes a mounting flange, 8 denotes a picoammeter, 11 denotes a current introduction terminal of the ion collector, 21, 21' denote current introduction terminals of the grid, 22 denotes a heating power supply of the grid, 31, 31' denote current introduction terminals of a hot-cathode filament, and 32 denotes a heating power supply of the filament.

The grid 2 (might also be called as an electron collector) is generally configured to have a spiral shape or a metal mesh shape with the hot-cathode filament 3 disposed as the electron source on its outside.

The needle ion collector 1' is disposed substantially at the center of the grid 2. The potential applied to the individual electrodes is such that a grid potential (a power supply 33 and a power supply 23) of 150V to 180V and a filament potential (power supply 33) of 30V to 50V, and the ion collector 1' is set at a ground potential.

When the filament 3 is subjected to electric current heating by the heating power supply 32 of the filament in the above-described state, electrons are emitted from the filament 3 and accelerated toward the grid 2. Since the grid 2 has a lattice or metal mesh shape, part of electrons passes through the lattice spaces to flying out toward the opposite side. After passing through the grid, the electrons are reflected on a wall 4 on the opposite side and oscillated within and outside of the grid 2. While oscillating, part of the electrons is collided with and absorbed by the grid 2. An electric circuit is configured so that the electrons lost at the grid 2 are always supplemented from the hot-cathode filament 3, and constant electrons can be oscillated within and outside of the grid 2. Part of the oscillated electrons impacts with the residual gas molecules which have flown into the grid 2, and generates positive ions in the grid 2. The positive ions are collected by the needle ion collector 1' which is set at the ground potential, to flow into the picoammeter 8 for measurement of current intensity. This collector current (signal current) $I_i$ is proportional to residual gas molecular density (pressure) P, and represented by the following formula:

$$I_i = SI_e P \qquad (1).$$

$S(Pa^{-1})$ is a proportional constant which is called as a sensitivity coefficient, and $I_e$ is an electron beam current. In other words, the pressure P in the vacuum apparatus can be determined by measuring $I_i$. According to a typical BA type ionization vacuum gauge, when it is operated at $I_e$=several mA, S is about $0.1 \sim 0.2$ $Pa^{-1}$.

To produce higher quality industrial products, the recent manufacturing industry using vacuum often conducts that the vacuum apparatus is once discharged to an ultrahigh vacuum region, then vacuum deposition is performed (pressure is increased), argon gas is introduced to perform sputtering, or device producing gas is introduced, so that the BA type ionization vacuum gauge as shown in FIG. 10 having a large measuring pressure range is becoming important more and more because of traveling between an opening to the atmosphere and an ultrahigh vacuum.

But, when the ionization vacuum gauge repeats the opening to the atmosphere or is used in a gas composition environment containing pollutant molecules (often organic matter), sensitivity S of the ionization vacuum gauge lowers, causing a problem that the pressure cannot be measured accurately. Therefore, products produced in vacuum are in non-uniformity or include defective ones, and the inaccuracy of the pressure measurement by the ionization vacuum gauge is now a serious problem in the industry. Therefore, there is used an uneconomical technology that the probe of the ionization vacuum gauge is exchanged periodically. But, the use of such a method involves lowering of the sensitivity until the probe is exchanged, and the accurate pressure measurement is not performed.

The problem of lowering of the sensitivity S is considered as follows. If there are gas molecules of a pollutant having high adsorbing property, they are adsorbed by the grid 2 of the ionization vacuum gauge, and the adsorbed molecules are subjected to electron impact, decomposed and solidified on the surface of the grid to become a substance which is hard to conduct electricity. And, the electrons become hard to flow into the grid, the electron current $I_e$ of the formula (1) is disturbed, and the sensitivity is deteriorated.

As a method of avoiding the above problem, the grid temperature is increased to prevent the generation of the adsorbing molecules, thereby to avoid this problem. As one of such means, one of the present inventors has disclosed a method to suppress the adsorption of the pollution gas molecules in order to prevent the adsorption of electron stimulated desorption molecules (JP-A 2000-39375). According to the disclosure, the grid is heated to about 120° C. by heat generated by the collision of the electrons, which are emitted from the filament, with the grid even if there is no means for heating independently. But it has been found that the polluted molecules which cause the electron stimulated desorption can still be adsorbed at this temperature. The adsorption of the polluted molecules which cause the electron stimulated desorption decreases at a temperature in a range of from higher than 200° C. to 600° C. Therefore, it is known that it is important that the temperature to suppress the adsorption of pollutants on the metal surface is set to 200° C. or higher.

If the BA type ionization vacuum gauge, which is actually on the market and has the structure of FIG. 10, has lots of gas molecules which are discharged from the metal itself of the grid 2, it cannot measure a pressure accurately, so that degassing and cleaning of the grid 2 are conducted before the pressure measurement in order to reduce the gas discharge. Two methods are available for that. When the grid is spiral as shown in FIG. 10, a degassing operation is performed by directly flowing electric current to the grid 2 by the power supply 22 which is connected to the grid 2, to increase the temperature to about 1000° C. by resistance heat of the grid line. To withstand this temperature, a tungsten wire, a molybdenum wire or the like having a high melting point is used as the grid material. When a spiral grid made of tungsten of, for example, about Φ0.8 mm is used to heat by electrifying as described above, it is necessary to flow a large current of 12 A to 15 A to the grid wire to obtain a temperature of 1000° C., at which a degassing effect can be expected, and the vacuum terminals are required to have a thick shape which allows the passage of a large current.

On the contrary, in the case where the grid has a shape of a metal mesh, it is hard to heat by electrifying because of its structure, so that the degassing operation is performed by applying a voltage of about 400~600 V between the grid 2 and the filament 3 to heat the grid to about 800 to 1000° C. by electron bombardment heating of 30~50 mA. When the electron impact is used for cleaning, it must be performed in a considerably good vacuum state. Otherwise, there is a possibility that a large amount of gas is discharged just when the electron bombardment heating is started, an electric discharge phenomenon occurs to destroy the electron source, and the power supply connected to them is damaged. Therefore, when the ionization vacuum gauge is used in a vacuum environment where pollutant molecules are generated, pollutant molecule ions in large quantity are generated by cleaning with the electron bombardment heating, resulting in a possibility of conversely increasing the pollution.

Use of the above two grid degassing methods can somewhat remove the contamination from the grid to some extent. But, they are not the methods to keep heating at all times and cannot freely change the temperature of the grid 2, so that if lowering of the sensitivity occurs when measuring, it is apparent that the pressure is low correspondingly and an incorrect pressure is measured.

The pollution on the grid is one which is caused by a phenomenon that the adsorbed molecules are decomposed, while the pollution on the ion collector is one caused by sedimentation, so that the quality of the pollution is fundamentally different between them. In other words, pollution gas molecules are decomposed into active polluted molecule ions and active pollution atomic ions in the space of the grid by the collision of the electrons. But, the decomposed ions are often positive ions, so that they are easily attracted by the ion collector which is at a ground potential. In the case of ions which are obtained from ordinary vacuum residual gas molecules, after the electrons are received on the surface of the ion collector, they become neutral molecules and move away from the ion collector. But, in the case of pollutant ions, they have a large molecular weight and often remain on the ion collector. Since they are active and have a tendency to cause a polymerization reaction on the ion collector, they change to a substance having a larger molecular weight and become an insulator which hardly allows the flow of electricity when the reaction occurs.

Recently, the BA type ionization vacuum gauge shown in FIG. 10 is often used at a high pressure of about 0.1 Pa, and the main stream in this type is that the ion collector is made to have a thin needle shape and positioned at the center of the grid is used. Therefore, a large amount of ions is gathered at a small needle portion having a small surface area, and if the ions are of a type containing pollutant ions, the surface is easily covered with the pollutant. In addition, since the ion collector cannot control the temperature, the temperature is 100° C. or below which is heated with radiant heat from the filament, so that the pollutant ions deposit easily. When the insulator film grows by this deposition, ions which get together to the ion collector later cannot receive electrons and stay on the surface of the ion collector in a positively charged state, and ions to be entered later are rebounded. This is the cause, of lowering the sensitivity.

As described above, for the ionization vacuum gauge, which is conventionally used for measurement of a pressure and comprised of at least the three electrodes of the grid 2, the electron source 3 and the ion collector 1', the method of preventing the occurrence of lowering the sensitivity of the ionization vacuum gauge due to the pollution of the electrodes can be realized for only the grid 2 by a known technology disclosed heretofore, but there is no method of preventing the pollution when measuring for the ion collector.

On the other hand, as an ionization vacuum gauge which had been used before the BA type ionization vacuum gauge is invented, there is an ionization vacuum gauge which is called a triode type ionization vacuum gauge with a hairpin type filament disposed at the center of a cylindrical grid and a cylindrical ion collector disposed outside of the grid. In other words, this ionization vacuum gauge is an ionization vacuum gauge which collects positive ions generated in a doughnut space between the grid and the ion collector into a cylindrical ion collector and measures the pressure. By reducing the electron current to the microampere range, it is possible to measure a pressure starting from 100 Pa which is higher by two digits or more than the BA type ionization vacuum gauge. Since the ion collector is cylindrical and has a very large surface area, it has a very excellent characteristic that a change in the sensitivity with time due to the pollution is smaller in comparison with the BA type ionization vacuum gauge.

But, the triode type ionization vacuum gauge is hardly used today because a pressure measurement limit inherent to an ionization vacuum gauge and called as X-ray limit is high to about $10^{-6}$ P, and the pressure of the ultrahigh vacuum region cannot be measured. Conversely, the BA type ionization vacuum gauge is an ionization vacuum gauge invented by Bayard and Alpert in 1950 in order to improve the X-ray limit up to the $10^{-9}$ Pa range. Therefore, it can be said that X-ray limit is improved toward a lower side as the ion collector has a smaller surface area, but an influence on the pollution has a tendency to become large conversely.

As described above, the upper limit of the pressure measurement by the ionization vacuum gauge is about 1 Pa when the BA type ionization vacuum gauge is used and about 100 Pa when the triode type ionization vacuum gauge is used. If the pressure is higher than the above, the function as the ionization vacuum gauge is lost, and a damage due to oxidation of the hot-cathode filament is easily caused. Therefore, for measurement of a pressure higher than the above, a Pirani gauge that heat quantity which is lost from the heated thin line is proportional to the gas pressure is used. A concept of using the electrodes in the ionization vacuum gauge to provide a function as the Pirani gauge has been disclosed and known well.

A method for measuring a pressure of a high pressure side by lowering a temperature of a hot-cathode filament of an ionization vacuum gauge and operating the Pirani gauge is disclosed in JP-A 10-213509, and a method for operating the grid of an ionization vacuum gauge as the filament of the Pirani gauge is disclosed in JP-A 2000-329634. There methods have problems, respectively To provide the filament with the function of the Pirani gauge, the surface of the filament must be stable. But, the filament to be used for the recent ionization vacuum gauge is required to be resistant to a low temperature operation and corrosion so as to withstand a severe vacuum environment, and an iridium filament coated with thoria ($ThO_2$) or yttria ($Y_2O_3$) has come to be used. Therefore, when this oxide-coated filament is used as a resistor of the Pirani gauge, the surface is porous and heat conduction is also poor, so that the heat exchange with gas molecules is deteriorated, resulting in a problem of poor stability. And, when the grid is used as a resistor of the Pirani gauge, it is necessary to use a thick coil-shaped grid line having a line diameter of 0.2 mm or more in view of the problem of the shape stability of the grid. Since the line diameter is too thick as the resistor of the Pirani gauge, a pressure range usable for measuring becomes very small. Therefore, it cannot be said that the above two disclosed known technologies are practical.

[Patent Document 1] JP-A 10-213509
[Patent Document 2] JP-A 2000-39375

Thus, where a pressure in a vacuum into which pollutant molecules come flying is measured, the surface of the ion collector adsorbs positive ions of decomposed matters which are generated from the pollutant, and an insulating pollutant film is continuously formed on the ion collector surface. Therefore, it is necessary to devise an ionization vacuum gauge for materializing a method which does not involve the occurrence of the above phenomenon.

Further, it is necessary to devise an ionization vacuum gauge which materializes a method of increasing a measurable range of a single ionization vacuum gauge from $10^{-9}$ Pa to 100 Pa and a practical method for measuring from the atmospheric pressure to a pressure between 1~100 Pa.

To solve the problems, the present invention provides an ionization vacuum gauge which has an ion collector provided with a heating device for heating the ion collector.

SUMMARY OF THE INVENTION

As means for solving the problem, the present invention provides an ionization vacuum gauge which has at least three electrodes of a grid, an electron source and an ion collector in a vacuum vessel connected in communication with a vacuum apparatus, oscillates electrons emitted from the electron source within and outside of the grid, ionizes gas molecules flying into the grid by the oscillated electrons, supplements the ionized ions by the ion collector to convert into a current signal, and measures a gas molecular density (pressure) in the vacuum apparatus according to the obtained current intensity, wherein the ion collector is provided with heating means for heating the ion collector.

Thus, the problem can be solved by creating conditions in that adsorption of pollutant molecules and decomposed material molecules is not caused by using the heating means which can independently raise the temperature of the ion collector by, for example, electric current heating.

As one method, the ion collector is formed to have a single metal wire shape, its both ends are connected to two feedthrough terminals respectively, means to which the power supply 5 for heating the ion collector can be connected is provided on the atmosphere side of the feedthrough terminals, and the temperature of the ion collector can be raised by electrifying, so that conditions in which pollutant molecules are not adsorbed can be produced. In this case, the temperature of the ion collector can be increased to 200° C. or higher to suppress the adsorption.

Further, measurement current when ion current collected to the ion collector is measured becomes measurement of a very low-level DC current of from 1 pA (picoampere) to 1 μA (microampere), but as means for heating the ion collector without affecting the current measurement, an electromagnetic induction heating method is used to configure an electric circuit which does not cause a problem to the ion current measurement, thereby capable of solving the problem.

In order to stabilize the electron current, it is necessary to perform an electric current heating method on both the electrodes, that can keep the increased temperature of 200° C. or higher at which the pollution of the ion collector and the grid can be prevented, but in order to minimize the burden on the vacuum terminals, it is necessary to configure by using the electrode material of the ion collector or the grid having high electric resistance and a relatively low steam pressure, and the temperatures of the ion collector and the grid can be raised to solve the problem.

Further, as another method that a load on the vacuum terminals for heating the ion collector and the grid by the electric current heating method is small, the problem can be solved by raising the temperatures of the ion collector and the grid with the load on the vacuum terminals minimized by disposing the high-frequency coil in the insulator vacuum vessel, disposing the high-frequency coil on the atmosphere side, and applying the high-frequency power into the vacuum vessel.

The measurement limit on the high pressure side of the BA type ionization vacuum gauge is up to about $10^{-1}$ Pa, but when the BA type ion collector is changed to a structure to perform electric current heating, the ion collector is reversed as a hot-cathode filament, a new cylindrical electrode is disposed outside of the grid, and the cylindrical electrode is determined as an ion collector of a three-electrode type ionization vacuum gauge. Then, simple switching of the switch can provide an ionization vacuum gauge which has both functions of the BA type ionization vacuum gauge and the triode type ionization vacuum gauge, namely a very large pressure measuring range of from $10^{-9}$ Pa to 100 Pa.

To provide the ionization vacuum gauge with the function as the Pirani gauge and to have the function with high reliability and practicable, it is desirable that the filament has a line diameter of 0.2 mm or less, and its surface reveals the metal surface. As one method thereof, the ion collector is formed into a single metal wire shape with its both ends connected to two feedthrough terminals respectively, and this collector is used as a resistor of the Pirani gauge. Thus, the ionization vacuum gauge can be provided therein with the function of the Pirani gauge.

According to the ionization vacuum gauge of the invention, since it is possible to always keep the clean surface by raising the temperature of the ion collector by, for example, electrifying, so that positive ions proportional to the pressure formed in the grid can be caught surely and can be detected as the ion current. Thus, the pressure can be always measured accurately even in a vacuum region where pollutant molecules are generated.

Since the grid can also be measured simultaneously while heating, the electron current can be controlled accurately, and the pressure measurement accuracy is enhanced considerably.

Further, the ion collector can be diverted as a hot-cathode filament of the triode type ionization vacuum gauge, so that a pressure of 0.1 Pa or more can be measured continuously by the same vacuum gauge, and it is not only advantageous economically, but also the pressure measurement range can be increased up to 100 Pa.

And, since it is possible to divert the ion collector electrode as the pressure measurement element of the Pirani gauge, there is also an effect that the pressure of a wide range of from the atmospheric pressure to $10^{-9}$ Pa can be measured by a single probe.

BEST MODE FOR CARRYING OUT THE INVENTION

Embodiments of the invention will be described in detail below with reference to the drawings.

Figure 1:
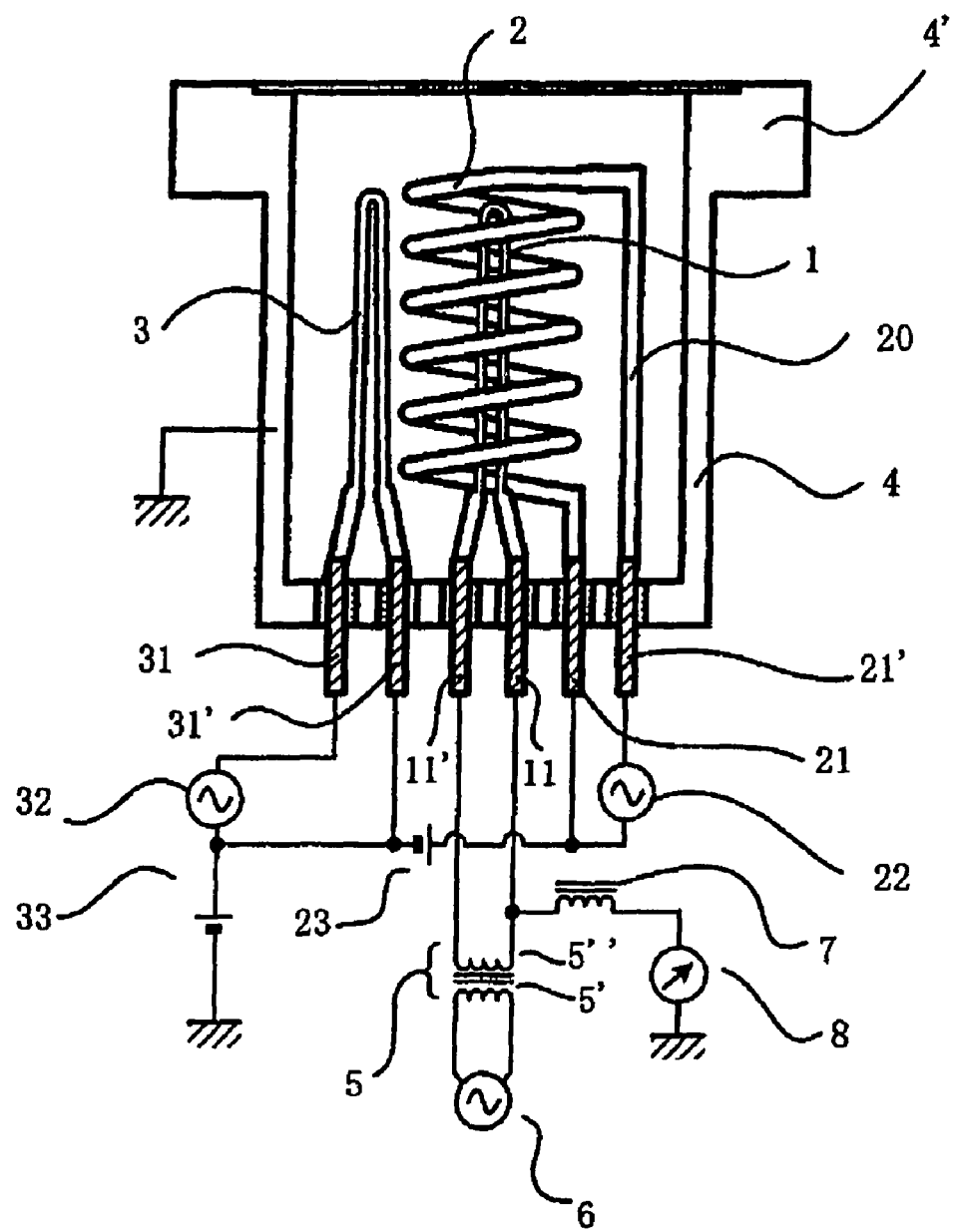
FIG. 1 A BA type ionization vacuum gauge according to an embodiment of the invention.
Figure 10:
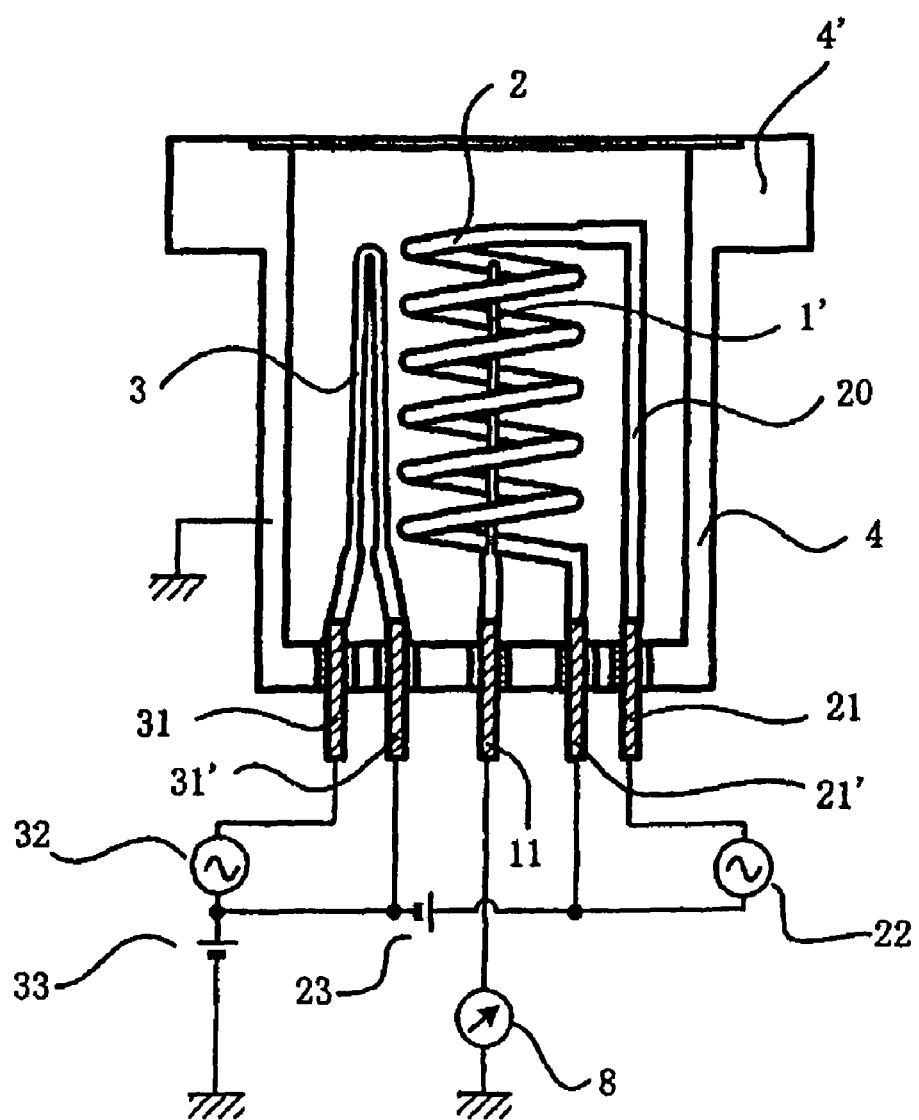
FIG. 10 A diagram showing a conventional BA type ionization vacuum gauge.

FIG. 1 shows an example that the BA type ionization vacuum gauge according to the invention is fitted to a vacuum apparatus (not shown). Like constituting elements as those shown in FIG. 10 are denoted by same reference numerals.

A grid 2 has a shape that a tantalum wire having a line diameter of Φ0.3 mm is wound nine turns into a spiral shape having an inner diameter of 6 mm. One end of the spiral line is connected to a feedthrough terminal 21, and the other end is connected to another feedthrough terminal 21' through a support electric wire 20. The two terminals are connected to a voltage-variable AC power supply 22 for heating the grid.

Figure 2:
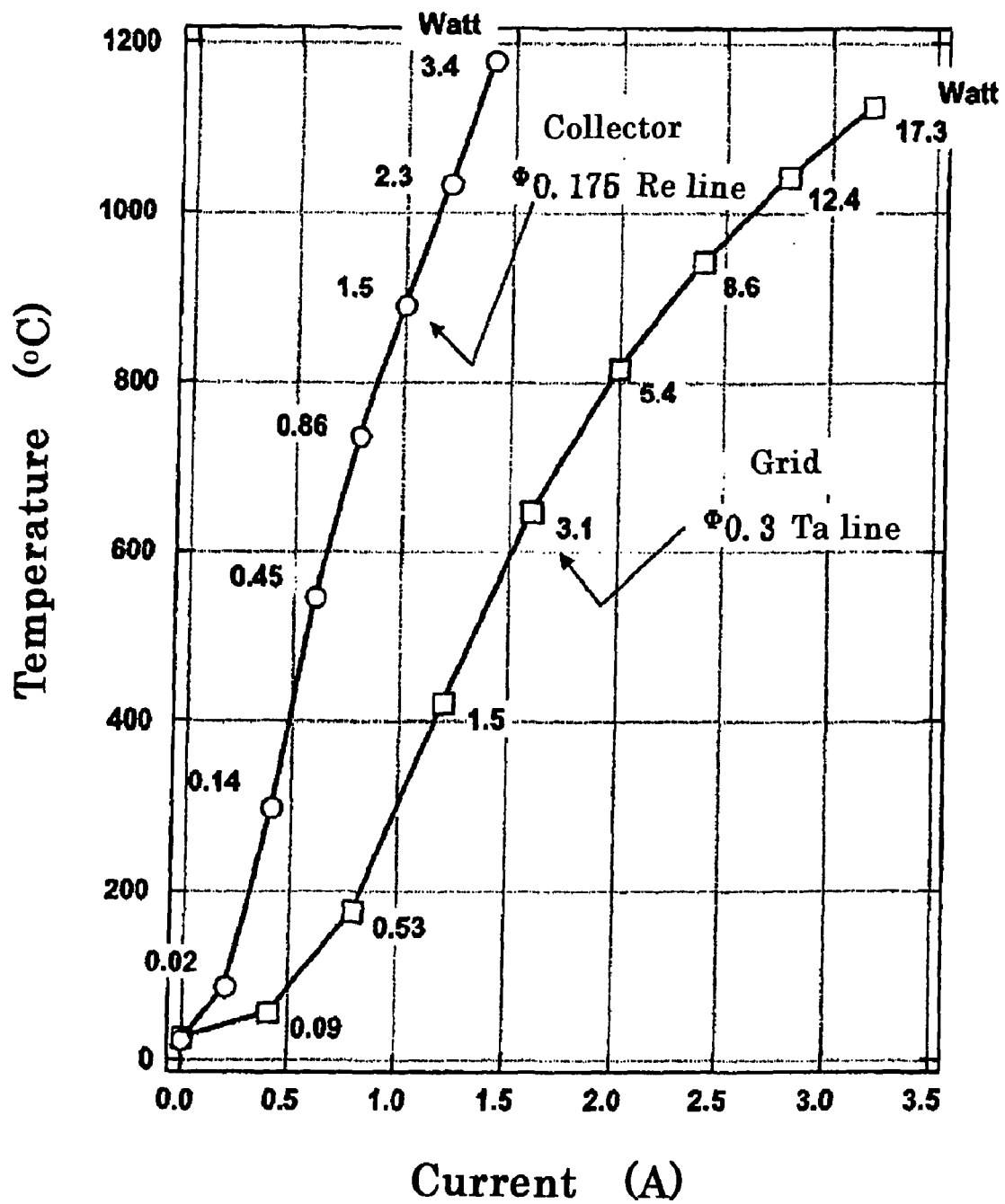
FIG. 2 A diagram showing an ion collector temperature and a grid temperature according to electrifying (alternate current), and values indicated adjacent to ○ and □ in the graph indicate power (wattage).

As shown in FIG. 2, the grid 2 of the above-described size can independently raise a temperature up to about 500° C. when a current of 1.4 A (2.3 W) is flowed to the grid 2, and up to 1000° C. when a current of 2.6 A (10.5 W) is flowed. Values indicated at the individual points of FIG. 2 show wattage of power, and the temperature corresponding to the above current and power is determined by an R type thermocouple having a line diameter of 0.05 mm spot-welded to substantially the center of the grid 2, and removed when used.

A filament 3 is formed by bending an iridium wire having a line diameter of Φ0.127 mm into a hairpin shape and sintering yttrium oxide powder on its surface and connected to current introduction terminals 31, 31'. The two terminals are connected to a filament heating AC power supply 32 which increases the filament 3 to a temperature at which electrons can be emitted, and the heating power supply 32 is adjusted so as to emit a constant electron current.

The ion collector 1 has a rhenium wire having a wire diameter of Φ0.175 mm bent into a hairpin shape and positioned at the center of the grid, its both ends are connected to independent current introduction terminals 11, 11' respectively and connected to an insulation transformer 5 having high resistance of $10^{14} \Omega$ or more of insulation resistance on the atmosphere side to form an electrical loop circuit by the ion collector 1, the current introduction terminals 11, 11' and a secondary coil 5". The secondary coil 5" is connected to a picoammeter 8, which is set at a ground potential, through a choke coil 7 which attenuate an AC signal. Further, an AC power supply 6 is connected to a primary coil 5' of the insulation transformer 5 to change the current flowed by electromagnetic induction, thereby adjusting the temperature of the ion collector 1 independently.

The ion collector 1 having the above-described size becomes about 500° C. when AC current of 0.55 A (0.44 W) is flowed, and about 1000° C. when AC current of 1.15 A (2.2 W) is flowed as indicated by the circles in FIG. 2. The temperature of the ion collector 1 with respect to the current and power is also determined similarly with an R type thermocouple having a wire diameter of 0.05 mm spot-welded to a leading end of a hairpin ion collector, and removed when used.

The material of the grid 2 is not limited to the tantalum wire, and the current to be flowed to the grid can be reduced by using a titanium material having high electric resistivity. In other words, the electric resistivity of titanium is about 151 μΩcm when heated to 950° C., which is about 3.7 times higher than 41 μΩcm of the tantalum wire in the embodiment of FIG. 1. Heat (power) generated by the resistor is determined by (resistance)×(current)$^2$, so that when the grid material having the same shape is changed to the titanium material, current can be reduced by $1/\sqrt{3.7}=1/1.9$, and heating up to 1000° C. can be made by a current of 2.6/1.9=1.4 A. And, a platinum-clad molybdenum wire or the like having good shape stability and surface oxidation resistance may be used.

Namely, the two feedthrough terminals are connected to the three electrodes of the ion collector 1, the grid 2 and the filament 3 according to the invention, the independent heating power supplies 5, 22, 32 are connected to them respectively, so that their temperatures can be adjusted independently.

Figure 3:
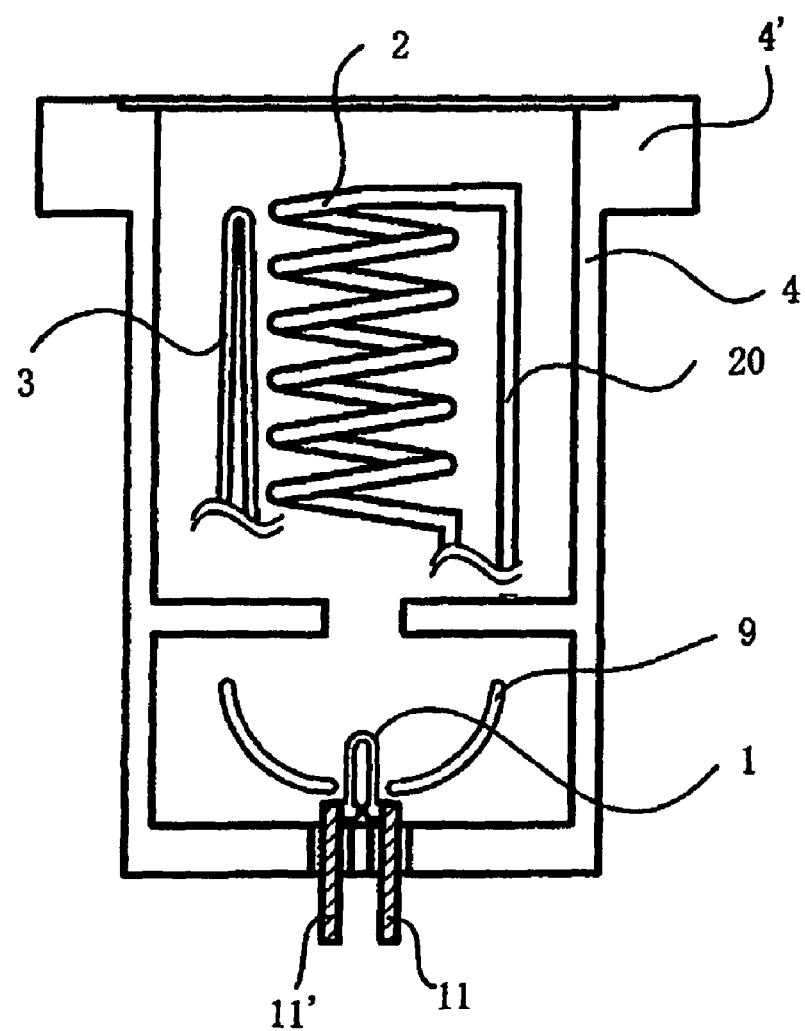
FIG. 3 A diagram showing a probe of an extractor type ionization vacuum gauge according to one specific example of the invention.

FIG. 3 shows an example (the grid terminals 21, 21' and the hot-cathode filament terminals 31, 31' are omitted) of a probe in a case where the invention is applied to an extractor type ionization vacuum gauge.

The hairpin shape ion collector 1 is inserted through the hole of a reflector 9, and a current is flowed from the atmosphere side to it via the vacuum terminals 11, 11', so that the ion collector 1 can always keep the surface clean.

Figure 4:
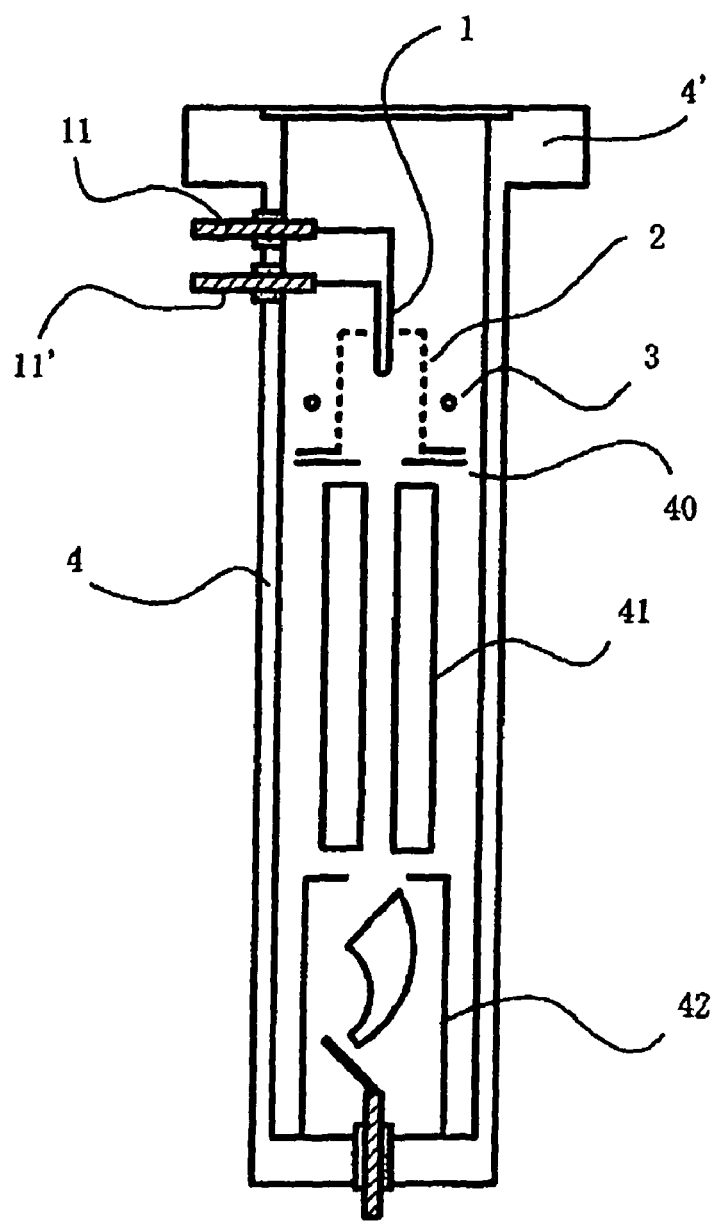
FIG. 4 A diagram showing a sensor unit of a quadrupole mass spectrometer that the present invention is applied to a total pressure measurement electrode.

Further, FIG. 4 shows an example of a sensor unit in a case where the invention is applied to a quadrupole mass spectrometer with total pressure measurement electrode. It is an application to the total pressure measurement electrode of the quadrupole mass spectrometer with total pressure measurement electrode of another patent application (JP-A 2005-85044) of the present inventors. The total pressure measurement accuracy of the quadrupole mass spectrometer is further improved by the present invention, and the analysis of gas generated from pollutant molecules in vacuum also becomes possible.

Figure 5:
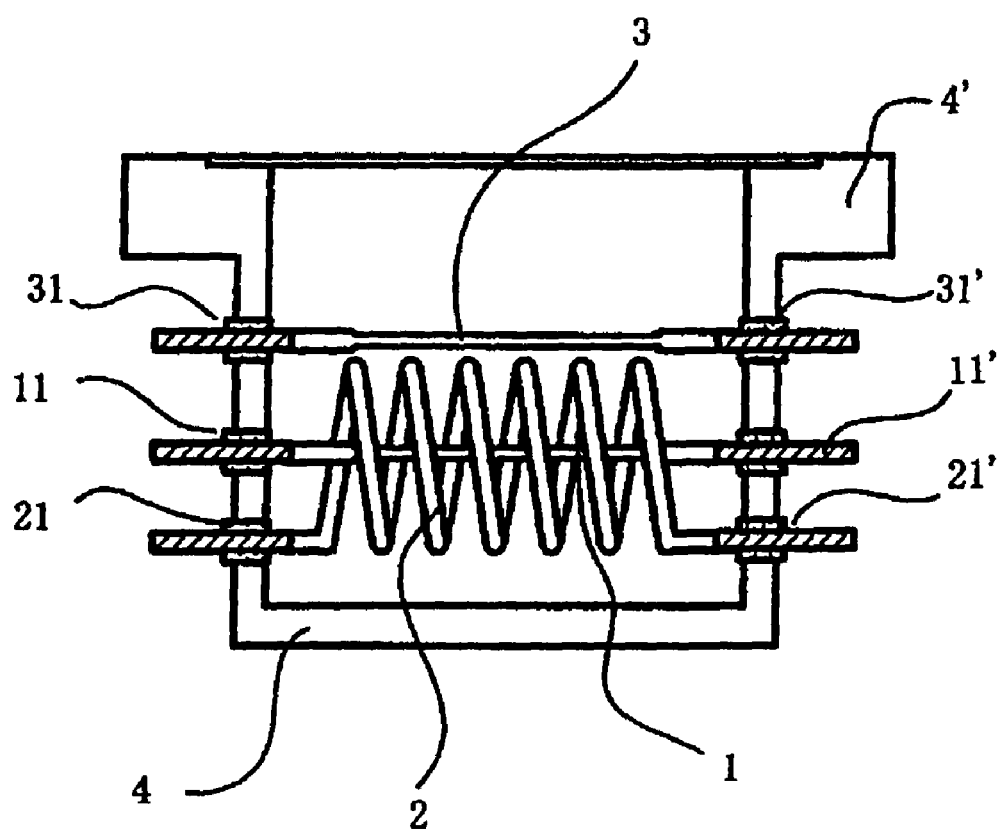
FIG. 5 A diagram showing a probe of a BA type ionization vacuum gauge which is disposed parallel to a flange.

The ion collector is not limited to the hairpin shape, and as shown in FIG. 5, the vacuum terminals 11, 11' may be disposed linearly in the grid at positions to face the side face of the vacuum vessel.

Figure 6:
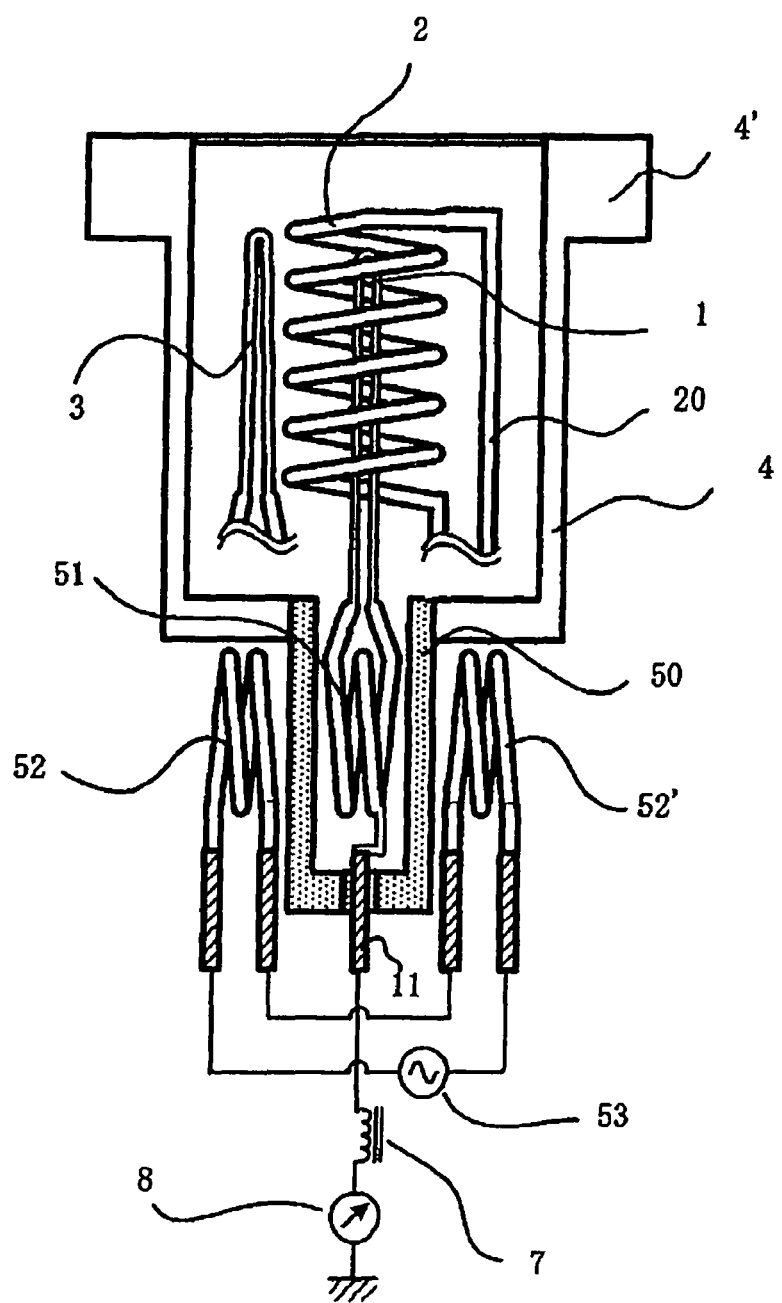
FIG. 6 A specific example indicating a part of a heating power supply portion and a probe of the BA type ionization vacuum gauge using a heating method according to a high-frequency coupling.

A specific example shown in FIG. 6 is a BA type ionization vacuum gauge which is devised in order to reduce a current load on the current introduction terminals. Introduction of heating power into the ion collector 1 applies high-frequency power from outside of vacuum by a transmitter 53 by a resonance circuit of an air core solenoid 51 and air core solenoids 52, 52' having it therebetween. Thus, the two vacuum terminals 11, 11' of FIG. 1 can be realized by one as shown in FIG. 6, and a current flowing to the current introduction terminal 11 is only the current obtained from the ion current of the ionization vacuum gauge, so that it is not necessary to use the current introduction terminal of the thick wire. The embodiment of FIG. 6 is an embodiment about the application of high-frequency heating power to the ion collector 1, but the invention is not limited to it. The high-frequency heating power applying method of the invention can also be applied to the heating power supply of the grid 2 having a larger current load.

Figure 7:
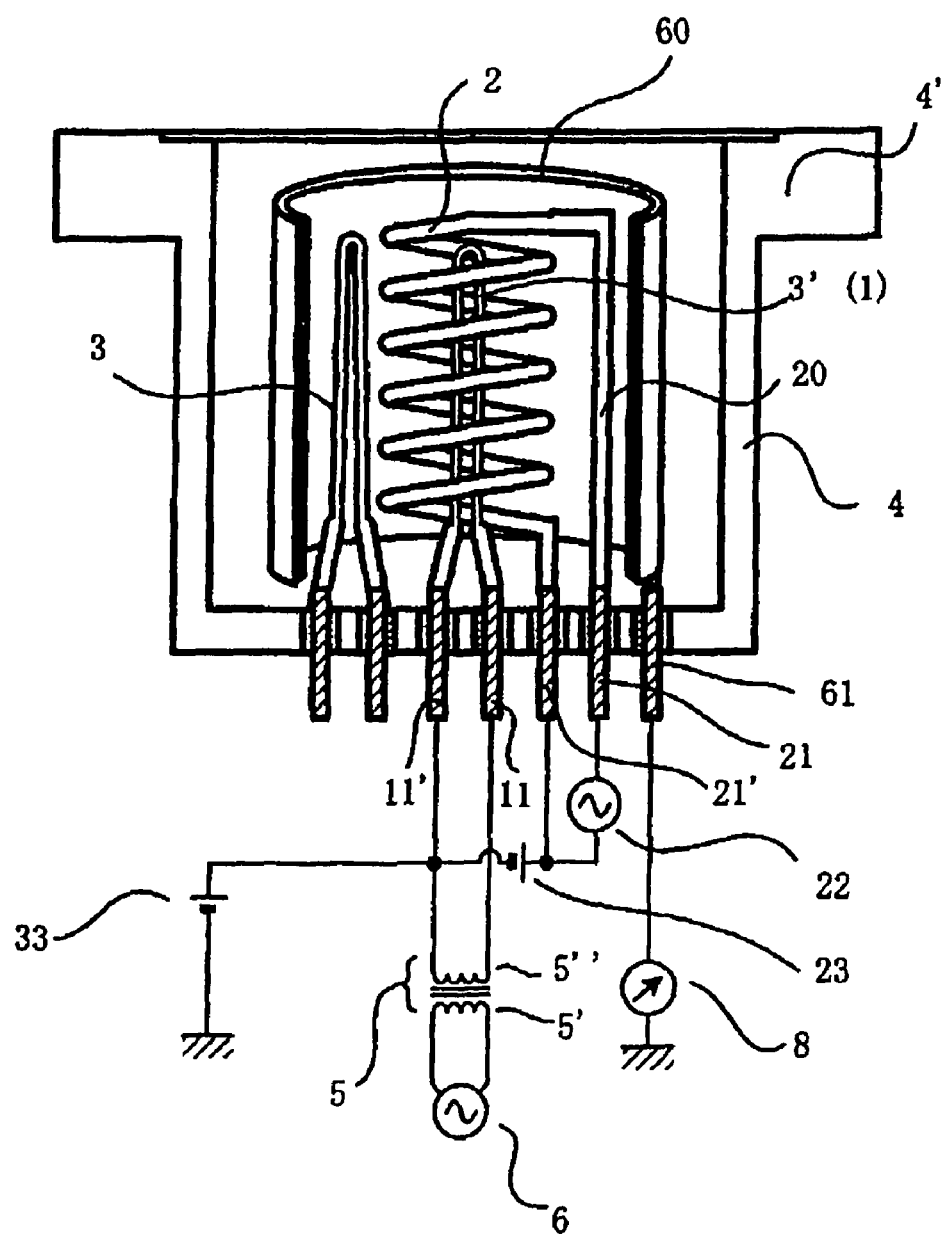
FIG. 7 A specific example of the BA type ionization vacuum gauge according to the present invention which can be diverted to a triode type ionization vacuum gauge.

The specific example shown in FIG. 7 is an example that the BA type ionization vacuum gauge of the invention is modified to the triode type ionization vacuum gauge. Namely, a cylindrical electrode 60 is disposed to enclose therein the three types of electrodes such as the ion collector 1, the grid 2 and the filament 3 of FIG. 1 as a specific example of the invention, and the electric circuit is switched so that the cylindrical electrode 60 becomes a new ion collector 60 to connect to the picoammeter 8 via a vacuum terminal 61. Further, when the hairpin type ion collector 1 disposed at the center of the grid 2 is switched as a new electron source 3', the electrons emitted from the electron source 3' can be controlled by the heating power supply 5. Thus, it can be diverted to the triode type ionization vacuum gauge which can measure up to a pressure higher by two digits or more than the BA type ionization vacuum gauge. At this time, the filament 3 used as the BA ionization vacuum gauge becomes unnecessary, but this electrode may be liberated or short-circuited to the grid 2.

Further, it is also included in the scope of applying the invention that as the heating means of the ion collector of the invention, the vacuum vessel 4 is made of glass or ceramic material, and an infrared lamp, a high-frequency heating device or the like is used to heat the cylindrical ion collector 60 from the outside atmosphere side, thereby minimizing the adsorption of the pollutant.

Figure 8:
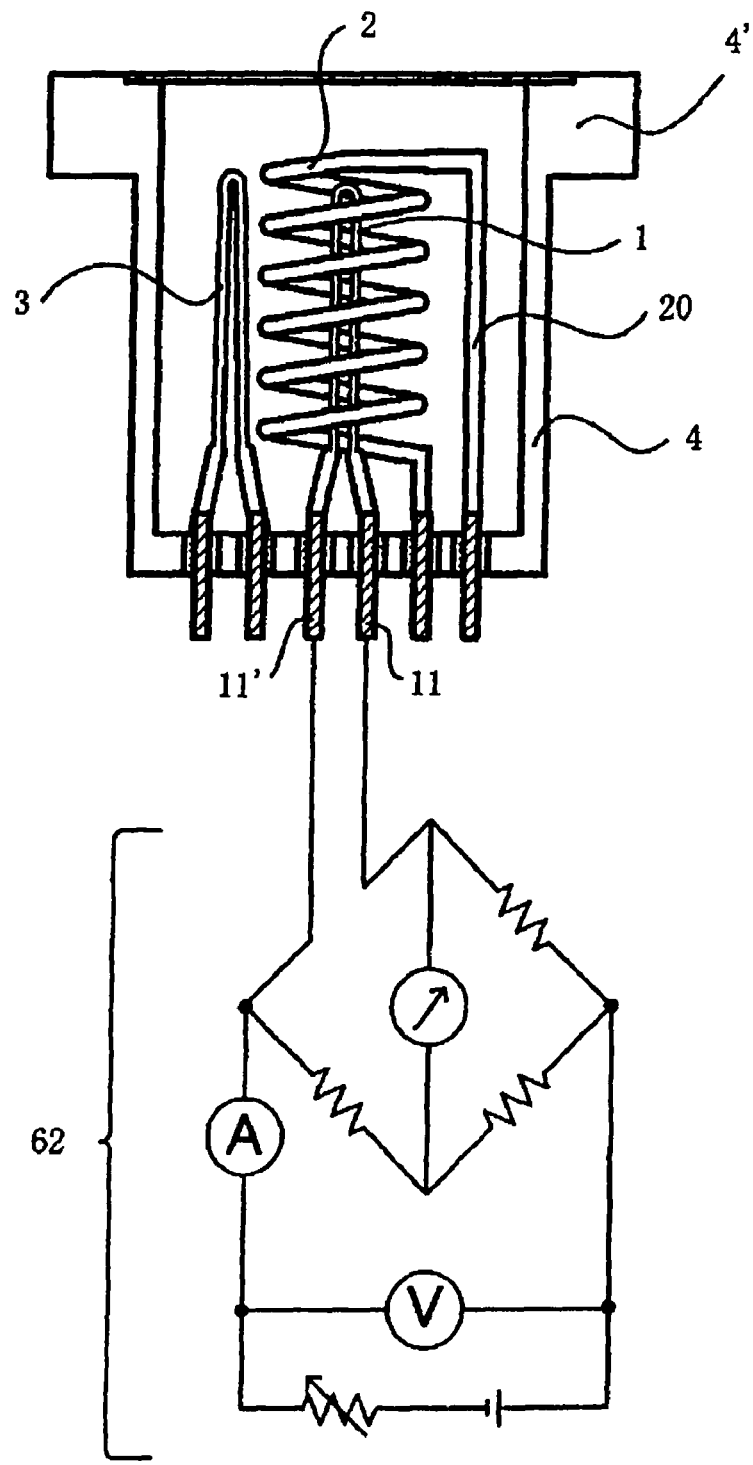
FIG. 8 A specific example of using the collector electrode of the present invention as a resistor of a Pirani gauge.

The specific example shown in FIG. 8 shows an example that the collector electrodes of the BA type ionization vacuum gauge of the invention are changed over by a switch (not shown) to connect the collector to a circuit 62 as a pressure element resistor of the Pirani gauge. For the line diameter of a thermal conductive resistor, the collector of a platinum clad molybdenum line of $\Phi 0.1$ to 0.15 can be formed. Therefore, it becomes possible to measure a pressure between the atmospheric pressure and 1 Pa, so that it becomes possible to measure a pressure between the atmospheric pressure and $10^{-9}$ Pa with high accuracy by a single probe of the invention.

The results of examining the embodiments of the invention will be described below.

Figure 9:
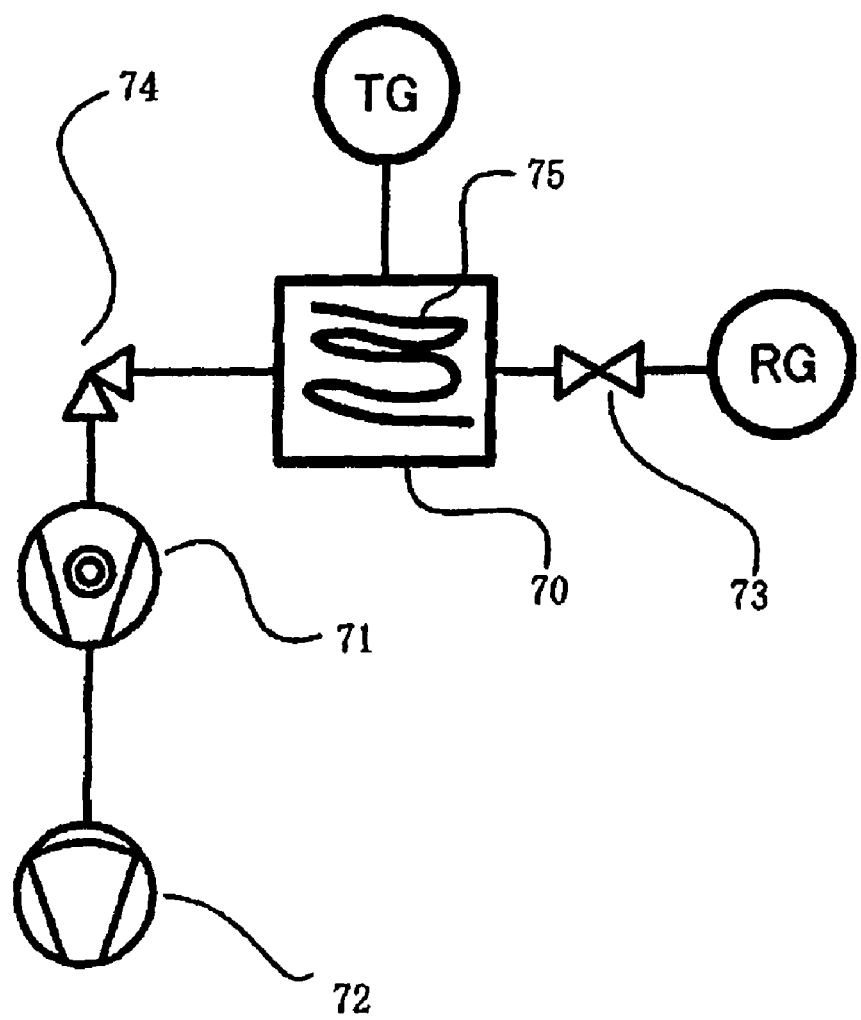
FIG. 9 A schematic diagram of a vacuum exhaust system used for examination of the invention.

The embodiment of the invention according to FIG. 1 was examined by the compact vacuum exhaust device shown in FIG. 9. In FIG. 9, a chamber 70 had a volume of 0.5 liter, exhaustion was performed by a 50 liters/sec compact composite turbo-molecular pump 71 via a valve 74, and rough pumping was performed by a diaphragm pump 72.

The examination ionization vacuum gauge (hereinafter referred to as the TG) of FIG. 1 of the invention is connected to the chamber 70. A reference ionization vacuum gauge (hereinafter referred to as the RG) for examining the sensitivity variation of the TG is also connected, but a valve 73 is fitted at the midway in order to prevent the pollution of the RG. The valve 73 is closed during a lighting test of the TG, and the RG is lighted out. As a pollution gas source, a 10 A electric wire 75 made of silicone rubber and having a diameter of $\phi 5$ mm and a length of about 1600 mm was put in the chamber 70, and gas generated from the silicone rubber, when exhaustion was continued, was used.

Pumping was started from the atmospheric pressure, after a lapse of about ten minutes, the RG indicated a pressure of $3.3 \times 10^{-1}$ Pa, and the TG indicated a pressure of $3.4 \times 10^{-1}$ Pa. It was confirmed that the TG had substantially equal sensitivity as that of the RG. After that, the RG was switched off, the valve 73 was closed to be separated from the system, the valve 74 was adjusted to reduce an pumping conductance, and the pumping was continued for another six hours while keeping the $10^{-1}$ Pa range. Then, the valve 73 was opened, and the RG was lighted. It was confirmed that when the RG indicated a pressure of $1 \times 10^{-1}$ Pa, the TG indicated a pressure lowered to $3.4 \times 10^{-3}$ Pa, and the sensitivity of the TG was lowered to about 1/100 of that of the RG. Then, the RG was switched off, and the valve 73 was closed again. The TG was left standing for another eight hours with the indication of the $10^{-3}$ Pa range maintained. As a result, the TG fell in a state that it could not secure a normal electron current, and the TG became unoperable.

Then, the valve 74 was fully opened, the current shown in the graph of FIG. 2 was flowed to the grid of the TG, the temperature of the grid was raised to 1000° C. and kept for about three minutes to clean the grid. Then, heating of the TG grid was stopped, and the TG was operated when the temperature was lowered sufficiently. The electron current was restored, and the TG indicated a very low pressure of $2.5 \times 10^{-7}$ Pa. Then, the valve 73 was opened, and the RG was switched on. It indicated a pressure of $1.4 \times 10^{-4}$ Pa. It was found that the TG was in a state that its sensitivity was lowered by three digits. In other words, it was found that the cleaning of the grid 2 by electrifying was useful for improvement to obtain a normal electron current but not useful for improvement of the sensitivity.

The valve 73 was closed, the current indicated in the graph of FIG. 2 was flowed to the ion collector 1 of the TG, and the ion collector 1 was kept at a temperature of 1000° C. for three minutes. Then, heating was stopped, after the temperature was lowered sufficiently, the pressure indicated by the TG was read to find that it was $8 \times 10^{-4}$ Pa. In that state, the valve 73 was opened, the pressure was measured by the RG to find it was $7 \times 10^{-4}$ Pa. The sensitivity of the TG was improved to substantially the equal level as that of the RG.

By the examination described above, it was confirmed that lowering of sensitivity of the ionization vacuum gauge was not the caused by pollution of the grid 2, but the pollution was mainly on the ion collector 1. Namely, it was clarified through the examination that when used in the same condition (the temperature of the ion collector is not raised) as a BA type ionization vacuum gauge having a conventional simple needle-like ion collector (reference numeral 1' of FIG. 10), indication was smaller by 1/100 to 1/1000 than the true pressure, and it did not perform the function as the vacuum gauge at all.

The vacuum vessel was opened, a new silicone rubber electric wire was prepared, and the same pumping as in the previous examination was started. The pumping was continued by flowing the current shown in the graph of FIG. 2 to the grid 2 of the TG to keep it at about 500° C. and also flowing the current shown in the graph of FIG. 2 to the ion collector 1 to keep it at about 500° C. Only when the pressure was calibrated on the way, the valve 73 was opened, the RG was switched on, and the sensitivity of a TG2 was examined. After the examination was completed, the procedure that the valve 73 was closed again, and the RG was also switched off was repeated.

It was confirmed in advance that after about 10 minutes from the start of the pumping, the RG indicated a pressure value of $1.8 \times 10^{-1}$ Pa and the TG indicated a pressure value of $2 \times 10^{-1}$ Pa, suggesting that the TG and the RG were substantially equal.

The valve 74 was adjusted to keep $10^{-1}$ Pa for six hours in the same manner as before. Then, when the indicated pressure of the TG was lowered, the RG was switched on for comparison, the RG indicated $3 \times 10^{-2}$ Pa, and the TG indicated $4 \times 10^{-2}$ Pa. The sensitivity of the TG was slightly higher than that of the RG, and the sensitivity of the TG was not degraded at all. When left standing for another eight hours in the same manner as above, the RG indicated a pressure of $3 \times 10^{-2}$ Pa, the TG indicated a pressure of $4 \times 10^{-3}$ Pa, and the sensitivity of the TG was not degraded at all.

It was proved by the above examined results that the BA type ionization vacuum gauge of FIG. 1 for measuring while raising the temperature of the ion collector 1 of the invention did not suffer from the degradation of the pressure indication due to pollution at all.

In the examination according to the invention, the method of keeping the raising of the temperature of the ion collector was indicated. But, it is not necessary to continuously clean the ion collector 1, and intermittent heating which is flash heating may be performed immediately before the measurement. In short, the invention includes any method if it is means for measuring an ion current by raising the temperature of a substance, which deteriorates the electric conductivity on the surface of the ion collector, by electrifying the ion collector, and removing the pollutant. The temperature was indicated as an operation condition of the collector and the grid, but it may be indicated by a current or power (wattage) which provides the temperature.

For description of the individual specific examples of the invention, the hairpin type hot-cathode filament was described as an example of the electron source 3. But, the electron source 3 is not limited to it, and any method such as an ion generation method using a cold-cathode emitter such as a Spindt-type emitter or a carbon nanotube emitter, or laser may be used.

For the heating power supply of the filament of FIG. 1, the heating power supply of the grid of FIG. 1 and the heating power supply of the grid of FIG. 7, the AC power supply was used, but those heating power supplies are not limited to the AC power supplies but may be DC power supplies.

INDUSTRIAL APPLICABILITY

The present invention is an ionization vacuum gauge used for analysis of a pressure and residual gas of a vacuum apparatus which is used in the semiconductor industry, the film forming industry for various types of films, development and production technologies for various types of products such as surface analytical instruments and electron microscopes, basic research departments such as accelerator science, and the like, requiring vacuum technology.

The invention claimed is:

1. An ionization vacuum gauge, comprising:
a vacuum vessel,
an electron source which is disposed in the vacuum vessel to emit electrons,
a grid which is provided in the vacuum vessel to oscillate the electrons emitted from the electron source and to ionize gas molecules by the electrons,
an ion collector which is provided in the vacuum vessel to supplement the ionized gas molecules to convert to a current signal, and to measure a gas molecular density (pressure) from the obtained current intensity, and
a first heating device which is provided in the ion collector to heat the ion collector,
wherein the grid is formed of a metallic resistor, both ends of the grid are connected to two vacuum terminals, other ends of the two vacuum terminals are connected to a first power supply for heating the grid, and the grid has a second heating device capable of heating independently the grid by the first power supply.

2. The ionization vacuum gauge according to claim 1, wherein the first heating device is configured to be able to raise the surface temperature of the ion collector to 200° C. or higher.

3. The ionization vacuum gauge according to claim 1, wherein the ion collector is configured of a single wire-shaped body.

4. The ionization vacuum gauge according to claim 3, further comprising a circuit comprised of current introduction terminals connected to the ion collector, and a second power supply for heating the ion collector connected to the current introduction terminals.

5. The ionization vacuum gauge according to claim 4, wherein the second power supply is an insulation transformer with an input primary coil and an output secondary coil separated in series, and has a circuit structure that the secondary coil connected to the ion collector is grounded to a ground potential and connected to a picoammeter, and the ion collector is heated by an AC power supply which is connected to the input primary coil without influencing on ion current measurement.

6. The ionization vacuum gauge according to claim 4, wherein the second power supply has a circuit structure that an air core solenoid to which the ion collector is connected is disposed in an insulator vacuum vessel, and air core solenoids to which a high-frequency transmitter is connected are disposed outside of the insulator vacuum vessel to form a resonance circuit between all the solenoids, the air core solenoid is also connected to the picoammeter which is grounded to the ground potential via vacuum current introduction terminals, and the ion collector can be heated without using a feedthrough terminal for heating the ion collector.

7. The ionization vacuum gauge according to claim 1, wherein the second heating device has a circuit structure that an air core solenoid connected to the grid is disposed in an insulator vacuum vessel, air core solenoids to which a high-frequency transmitter is connected are disposed on the atmosphere side outside of the insulator vacuum vessel to form a resonance circuit between all the solenoids, and the grid can be heated without using a current introduction terminal for heating the grid.

8. The ionization vacuum gauge according to claim 1, wherein either the grid or the ion collector is made of a high resistor material of metal or an alloy which has an electric resistance value of 20 μΩ·cm or more at 200° C. or higher.

9. The ionization vacuum gauge according to claim 1, wherein a cylindrical electrode enclosing therein the whole of the grid, the electron source and the ion collector is disposed in the vacuum vessel, and the cylindrical electrode has a function as an ion collector electrode.

10. The ionization vacuum gauge according to claim 9, wherein the ion collector is operated as an auxiliary electron source.

11. The ionization vacuum gauge according to claim 1, comprising a circuit structure which uses the ion collector as a resistor of a Pirani gauge.

* * * * *

UNITED STATES PATENT AND TRADEMARK OFFICE
CERTIFICATE OF CORRECTION

| | | |
|---|---|---|
| PATENT NO. | : 7,741,852 B2 | Page 1 of 1 |
| APPLICATION NO. | : 11/920085 | |
| DATED | : June 22, 2010 | |
| INVENTOR(S) | : Fumio Watanabe and Reiki Watanabe | |

It is certified that error appears in the above-identified patent and that said Letters Patent is hereby corrected as shown below:

In the front page, Item (73), Assignee: change "Mori Patent Office" to --Ampere Inc.--.

Signed and Sealed this
Fourteenth Day of June, 2011

David J. Kappos
*Director of the United States Patent and Trademark Office*